United States Patent [19]

Kemper

[11] 4,233,851
[45] Nov. 18, 1980

[54] INFINITELY VARIABLE TRANSMISSION UNIT AND METHOD

[75] Inventor: Yves J. Kemper, Birmingham, Mich.

[73] Assignee: Vadetec Corporation, Troy, Mich.

[21] Appl. No.: 36,231

[22] Filed: May 4, 1979

[51] Int. Cl.³ ............................................. F16H 15/16
[52] U.S. Cl. ........................................ 74/191; 74/690
[58] Field of Search ................ 74/191, 192, 196, 198, 74/200, 690, 865, 796

[56] References Cited

U.S. PATENT DOCUMENTS

| Re. 29,328 | 8/1977 | Kemper | 74/190 |
|---|---|---|---|
| 2,139,560 | 12/1938 | Olson | 74/191 X |
| 2,721,483 | 10/1955 | Hacker | 74/191 |
| 3,406,597 | 10/1968 | Perry et al. | 74/865 |
| 3,420,114 | 1/1969 | Prestl | 74/191 |
| 3,630,095 | 12/1971 | Eakin | 74/191 |
| 3,910,137 | 10/1975 | Nedeljkovitch | 74/191 X |
| 4,112,779 | 9/1978 | Kemper et al. | 74/191 |
| 4,112,780 | 9/1978 | Kemper et al. | 74/191 |
| 4,152,944 | 5/1979 | Kemper | 74/191 |
| 4,152,945 | 5/1979 | Kemper | 74/191 |
| 4,152,946 | 5/1979 | Kemper | 74/193 |

Primary Examiner—C. J. Husar
Assistant Examiner—Moshe I. Cohen
Attorney, Agent, or Firm—Robert F. Ziems

[57] ABSTRACT

An infinitely variable speed, power transmission unit and method in which three torque responsive bodies are shifted between driving, reaction and driven functions to effect alternate modes of operation in which two or more contiguous ranges of infinitely variable speed ratios are provided at high power transmitting efficiencies. Two of the three bodies establish a variable traction surface radius factor by which speed ratio is made infinitely or continuously variable in the range of each mode. The radius ratio factor is related to the gear ratio factor of alternately operable unit gearing in a way to enable the speed ratio range in one mode of operation to be an extension of the other mode. The unit enables synchronous shifting between operating modes in the sense that the radius ratio factor is varied in alternate directions between minimum and maximum values in any two of the respective alternate modes of operation.

28 Claims, 11 Drawing Figures

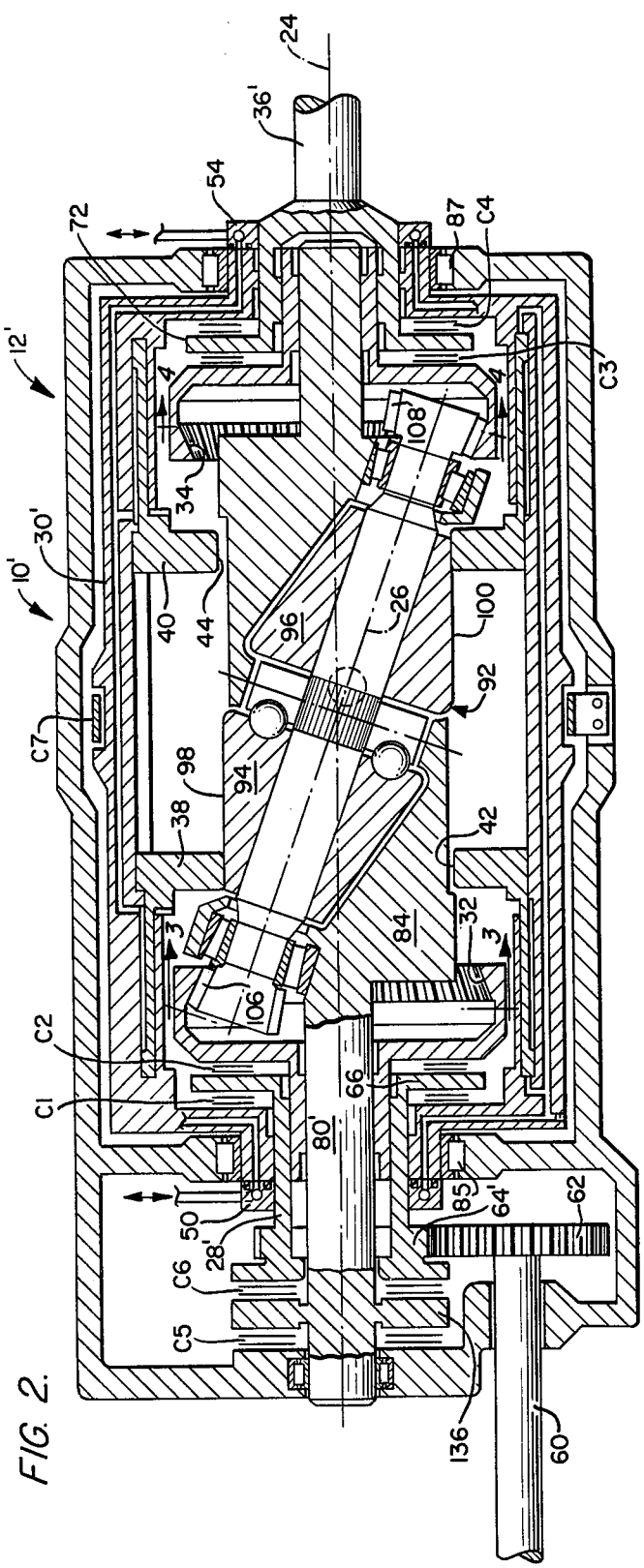
FIG. 2.
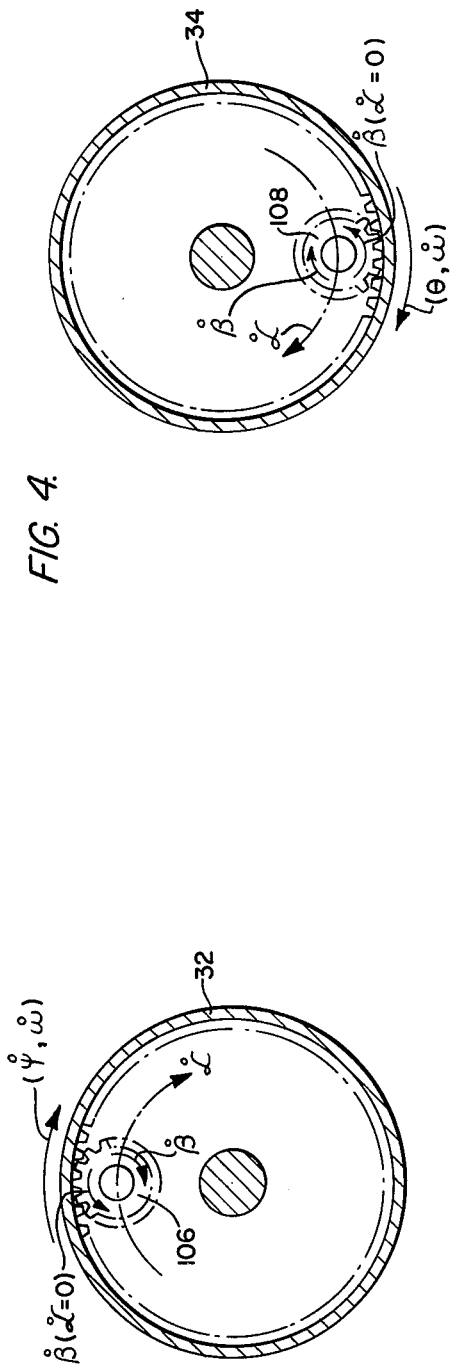
FIG. 4.
FIG. 3.

MODE 3a
$\dot\psi/\dot\theta = 1/(1-k\rho)$

MODE 3b
$\dot\psi/\dot\theta = 1/k\rho$

MODE 3c
$\dot\psi/\dot\theta = k\rho$

INFINITELY VARIABLE TRANSMISSION UNIT AND METHOD

BACKGROUND OF THE INVENTION

This invention relates to improvements in infinitely variable power transmissions and methods for the operation of same. More particularly, it concerns an infinitely variable transmission unit and method for selection of alternate operational modes by which power transmitting efficiencies are improved for any given range of speed ratios within the design limits of the unit.

Mechanical power transmissions which transmit torque from an input to an output at infinitely variable speed ratios are well known in the art and generally referred to as "I.V. transmissions." Because the power generating efficiency of most engines or prime movers is highest in only a limited range of operating speeds, I.V. transmissions have and continue to generate much interest as a potentially ideal solution to the transmission of power from a power source to a power-consuming load which must be driven at speeds varying from the operating speeds of the power source.

Mechanical I.V. transmissions are generally embodied in a structural organization capable of transmitting torque by friction between two or more traction surfaces on relatively rotatable bodies supported in such a manner as to enable the traction surfaces to be retained against one another under a normal force adequate to prevent slippage between the surfaces. The infinitely variable speed ratio is achieved by designing the torque arm or radius of one of the bodies to be continuously variable relative to the radius of the other body. The geometric configuration of two such bodies capable of attaining this result is exemplified by a wheel shiftable axially on a disc or a ring shiftable along the axis of a cone.

In a commonly assigned copending U.S. Pat. application, Ser. No. 706,291, filed July 19, 1976, now U.S. Pat. No. 4,152,946, in the name of the present inventor, several embodiments of infinitely variable transmissions are disclosed in which three frame supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed respectively, an "alpha body" which is supported by the transmission frame to be concentric with a first axis, a "beta body" which is concentric with a second axis inclined with respect to and intersecting the first axis at a point of axes intersection, and an "omega body" carried by or forming part of the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

It is to be noted that the terms "alpha body," "beta body" and "omega body" are completely arbitrary and as such, do not restrict the components designated thereby either to the class of transmission represented by the disclosure of the aforementioned application or to specific structure to be described hereinafter. The terms will, however, lend consistency of definition in the description to follow and facilitate an understanding of various speed relationships to be expressed by algebraic equations.

The infinitely variable speed ratio capability of such transmissions is achieved by providing one of the beta and omega bodies with a pair of rolling or traction surfaces which are surfaces of revolution about the concentric body axis and which are of variable radii along that axis in symmetry with the point of first and second axes intersection. Physically, such rolling surfaces will thus provide the one body with a biconical-like configuration. The other of the beta and omega bodies is provided with a pair of rolling or traction surfaces which are also surfaces of revolution about the concentric body axis but which are of relatively constant radius. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\overset{\circ}{\alpha}$) about the first axis, the rotational speed of the beta body about the second axis in a fixed frame of reference is ($\overset{\circ}{\beta}$) and the rotational speed of the omega body on the first axis is ($\overset{\circ}{\omega}$), then the respective speeds of the three bodies are related by the following equation:

$$\overset{\circ}{\omega} - \overset{\circ}{\alpha} + (\overset{\circ}{\alpha} - \overset{\circ}{\beta})R_b/R_w = 0 \tag{1}$$

Because one of either the beta or the alpha body extends within the other of such bodies, the radius ratio $R_b/R_w$ may represent a value of either less than 1 (where $R_b$ is always less than $R_w$) or more than 1 (where $R_b$ is always greater than $R_w$). The function $\rho$ will be used hereinafter to designate either $R_b/R_w$ or the reciprocal $R_w/R_b$, whichever is greater than 1, it being understood that $\rho$ or its reciprocal $1/\rho$ are used appropriately.

Heretofore, a generally preferred mode of operating such transmissions has been to apply an input torque to the alpha body to carry the beta body in nutation and hold the omega body against rotation ($\overset{\circ}{\omega}=0$). The beta body is linked with an output shaft rotatable on the first axis by gearing having a ratio factor (k) which theoretically may be of any value and also may be made either positive or negative depending on the particular gearing arrangement used. In light of the foregoing, where $\overset{\circ}{\theta}$ is unit output speed and taking into account the gearing ratio (k), the output/input speed ratio of the unit is determined by an equation:

$$\overset{\circ}{\theta}/\overset{\circ}{\alpha} = 1 - k\rho. \tag{2}$$

A principal advantage of operating in the mode represented by equation (2) is that the physical parameters of such I.V. transmissions readily accommodate a range of values for the function (kρ) which permit a continuously variable output/input speed ratio range of from zero to 1 (1.0>kρ>0.5). Also, this range may be shifted to include an output reversal through zero merely by selecting a gear ratio (k) so that the function (kρ) brackets a numerical value of 1 (e.g. 1.2>kρ>0.7).

In addition to the aforementioned copending application, reference is also made to commonly assigned U.S. Pat. No. Re. 29,328, reissued Aug. 2, 1977 in the name of Yves Jean Kemper; No. 4,112,779 and No. 4,112,780, the latter both having issued on Sept. 12, 1978, in the name of Yves Jean Kemper and Lucien Bigot. These issued patents disclose additional variations of the infinitely variable transmission type referred to above. As will be seen from these several prior patents, the particular configuration of any one of the alpha, beta and omega bodies as defined herein may vary in the respectively disclosed embodiments. It is also demonstrated by these prior developments as well as by the general equation of relative speeds given above as equation (1), that in a given embodiment, any one of the three working bodies may serve any one of the respective driving, driven or reaction torque functions. In no single embodiment, however, are these functions physically interchangeable without modification of structure.

The state-of-the-art relating to I.V. transmissions and systems incorporating same is further developed to a point where the speed ratio range of a unit may be enlarged by external epicyclic gearing in which the I.V. unit input and output are used as two inputs to the external epicyclic gearing in a way to drive a single system output shaft from the epicyclic gearing. Such systems, moreover, have accounted for synchronous operation in which the system may be shifted between one range of infinitely variable speed ratios with adjustment of the I.V. unit in one direction between the extreme limits of its radius ratio, and a second contiguous range of system speed ratios in which the I.V. unit is adjusted in the opposite direction between its limits of speed ratio variation. In this respect, see U.S. Pat. No. 3,406,597, issued Oct. 22, 1968, to F. G. De Brie Perry et al. While the use of such external epicyclic gearing to enlarge the speed ratio range available in an I.V. transmission unit solves the problem of expanding the range of speed ratios available in an I.V. transmission, epicyclic gear operation is objectionable from the standpoint of introducing efficiency losses in the system.

SUMMARY OF THE INVENTION

In accordance with the present invention, the structural organization of alpha, beta and omega bodies of the previously disclosed I.V. transmission design is arranged to provide multiple operating modes by which the range of infinitely variable speed ratios available by radius ratio variation in a given transmission design becomes a multiple of the range of speed ratios available in any one mode. The multiple modes of operation are achieved by alternating the respective driving and driven power transmitting functions of at least two of the three bodies which are movable while holding the remaining one of the bodies against movement as a reaction member. This alternating of function is, in turn, attained by fixing a pair of gears on opposite ends of one of the two movable bodies, each of such first pair of gears meshing with one of a second pair of gears of a different common diameter to establish a gear ratio factor (k). A control system is provided by which the other of the two movable bodies is coupled either with the transmission input or with the transmission output while the second pair of gears are respectively coupled with the same transmission input or output but in reverse phase relationship with respect to the alternate coupling of the input and output with the other of the two movable bodies. In this way, the direction of power transfer between the traction surfaces on two of the three bodies is made reversible. The gear ratio factor (k) of the first and second pairs of gears is positive so that meshing gears rotate in the same direction and related to the variable radius ratio factor ($p$) of the engaged traction surfaces to enable synchronous shifting between the alternate coupling of components at one end limit of the radius ratio range.

In a preferred embodiment, the alpha body of the transmission is retained against rotation as the reaction member, thus confining movement of the beta body to simple rotation about the second axis. The first pair of gears is in the form of a pair of pinion gears extending from opposite ends of the beta body and in mesh with ring gears independently rotatable about the first axis of the transmission. The omega body is in the nature of an exterior cylindrical body rotatable on the first axis and in a first mode of operation, is coupled with the transmission input. In this mode, the beta body is driven in rotation as a result of rolling friction contact between the omega and beta bodies. Power transmitted to the beta body in this fashion is transmitted by one of the pinion gears on the beta body to one of the ring gears which is coupled directly with the transmission output in this mode. Also in this mode, the gear ratio factor (k) causes the output shaft to be driven at a lower speed than the rotational speed of the beta body.

In a second mode of operation of the same embodiment, the beta body is driven in rotation by one of the two ring gears coupled at this time with the transmission input. Because of the gear ratio factor (k), the rotational speed of the beta body is higher than the input shaft. Beta body power is transmitted by friction to the omega body which is now coupled directly with the transmission output. Output speed will be at or below the rotational speed of the beta body in this mode of operation due to the radius ratio factor ($p$) of the frictionally engaged traction surfaces on the beta and omega bodies. It is contemplated that in this embodiment, an external multi-speed gearing be used to expand further the synchronous and continuously variable speed ratio range of the transmission.

In an alternative embodiment, the same organization of transmission bodies is provided with a control system by which the alpha body may be either retained against rotation as the reaction member to effect second and third modes of operation corresponding, respectively, to the first and second modes of operation explained in connection with the preferred embodiment. Also in the modified embodiment, a control is provided by which the omega body is either held against rotation as a reaction member or permitted rotation. When the omega body is so held as a reaction member and the alpha body driven as the input, a first mode of operation is carried out in which the speed ratios are governed by equation (2) above. In the alternative embodiment, therefore, the range of continuously variable speed ratios is extended to zero when expressed as output/input or infinity when expressed as input/output.

A primary object of the present invention is to provide an infinitely variable transmission unit and method capable of providing a synchronously shiftable, continuously variable, expanded range of speed ratios and which is capable of operation at high power transmitting efficiencies throughout the expanded range.

Other objects and further scope of applicability of the present invention will become apparent from the detailed description to follow taken in conjunction with the accompanying drawings in which like parts are designated by the same reference numerals.

BRIEF DESCRIPTION OF THE DRAWINGS

FIG. 2 is a similar cross-section depicting an alternative embodiment of the present invention;

FIG 3 is a fragmentary cross-section on line 3—3 of FIG. 2;

FIG. 4 is a cross-section on line 4—4 of FIG. 2;

DETAILED DESCRIPTION OF THE PREFERRED EMBODIMENTS

Figure 1:
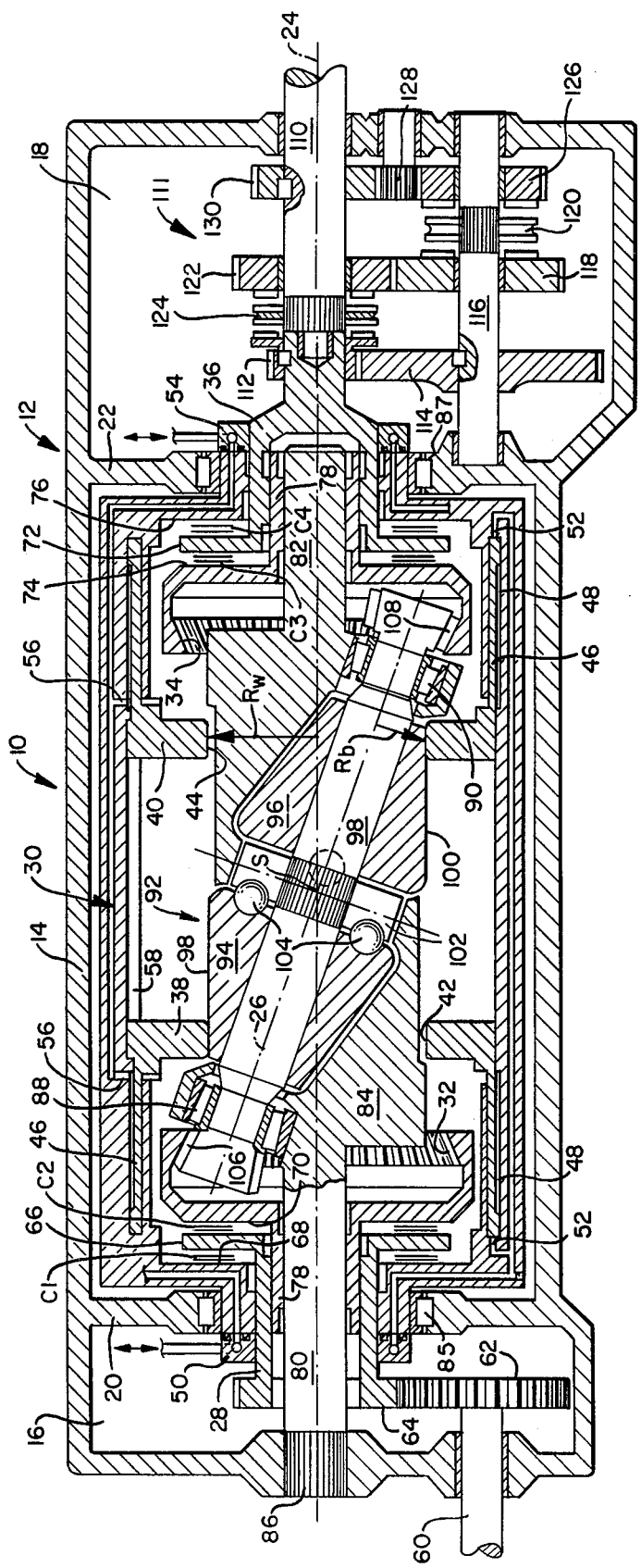
FIG. 1 is a longitudinal cross-section through an I.V. transmission in accordance with one embodiment of the present invention.

In FIG. 1 of the drawings, a preferred embodiment of an infinitely variable or I.V. transmission incorporating the present invention is generally designated by the reference numeral 10 and shown to include a frame 12 in the form of a casing having a generally cylindrical central section 14 and a pair of integral end sections 16 and 18 separated by load bearing wall formations 20 and 22. The operating components of the I.V. transmission unit are physically contained within the central casing section 14 and in general are arranged in relation to a pair of axes, both of which lie in the plane of the cross-section illustrated in FIG. 1. Specifically, these axes include a first or primary transmission axis 24 and a second transmission axis 26 inclined with respect to the first axis and intersecting the first axis at a point S of axes intersection.

Components which are supported for rotation about the first axis 24 include a tubular unit input shaft 28, a generally cylindrical omega body 30, a pair of ring gears 32 and 34 and a unit output shaft 36. The omega body 30 carries a pair of axially adjustable rings 38 and 40, each having a traction surface 42 and 44 which is a surface of revolution about the first axis 24 and of a relatively fixed radius $R_w$ with respect to that axis. As shown, the rings are carried by annular pistons 46 which extend within annular chambers 48. The omega body 30 is provided with a system of fluid conduits by which the pistons 46 and correspondingly the rings 38 and 40 may be adjusted or moved toward and away from each other along the first axis 24. In particular, hydraulic fluid introduced under pressure at a manifold 50 will be directed through ports 52 to advance the pistons 46 in a direction tending to move the rings 38 and 40 toward each other whereas hydraulic fluid introduced under pressure at a manifold 54 will direct pressurized fluid through ports 56 in a manner to move the rings away from each other. It will be understood that the introduction of fluid through one of the two manifolds 50 and 54 will require a discharge of such fluid from the other of the manifolds. Also it will be noted that the rings 38 and 40 are keyed in axial slots 58 formed in the omega body 30 so that the rings and the cylindrical support therefor rotate as a unit.

Each of the input and output shafts 28 and 36 are similarly constructed and journalled for rotation within the end journals of the omega body 30. The input shaft 28 is adapted to be driven by a power shaft 60 through gears 62 and 64 and carries at its inner end, a clutch plate 66. The clutch plate 66 is situated between a clutch face 68 on the interior of the omega body 30 and a similar clutch face 70 on the back of the ring gear 32. The plate 66 may be releasably coupled with the omega body by a clutch C1 or to the ring gear 32 by a clutch C2.

The unit output shaft 36 is similarly journalled within the opposite end journal of the omega body 30 and carries at its inner end a clutch plate 72 situated between clutch faces 74 and 76 on the ring gear 34 and on the interior of the omega body 30, respectively. A pair of friction clutches C3 and C4 are again shown to releasably couple either the plate 72 and the ring gear 34 or the plate 72 and the omega body 30, respectively. Although the clutches C1, C2, C3 and C4 are shown only schematically in FIG. 1, it will be appreciated by those skilled in the art that these clutches may be any of several well known clutch constructions.

Each of the ring gears 32 and 34 is similarly constructed to include a sleeve-like hub portion 78 journalled between the respective input and output shafts 28 and 36 and a pair of axial shaft extensions 80 and 82 of an alpha body 84. In light of this organization of concentric radial bearings, it will be appreciated that each of the components journalled in the casing walls 20 and 22 are ultimately supported by a pair of bearings 85 and 87.

The alpha body 84, being supported by the shaft extensions 80 and 82 coupled with the radial bearing series between the shaft extensions and the walls 20 and 22, is adaptable for rotation about the first axis. In the embodiment of FIG. 1, however, the shaft extension 80 is fixed by splines 86 against rotation with respect to the frame 12. Thus, the alpha body is carried by the frame for response to torque about the first axis 24 but in this embodiment, is not rotatable about that axis.

Supported by the alpha body 84 through bearings 88 and 90 is a beta body generally designated by the reference numeral 92. The beta body 92 includes a pair of cone members 94 and 96 rotatably and slidably carried on a shaft 98 which in turn is rotatable about the second axis 28 as a result of the support of the shaft 98 at opposite ends in the alpha body supported bearings 88 and 90. The cone members define exterior traction surfaces 98 and 100 which are surfaces of revolution about the second axis 26 and engage the interior traction surfaces 42 and 44 of the omega body 30 at diametrically opposite points of contact spaced equally from the point S of axes intersection. The traction surfaces 98 and 100 are thus oppositely convergent conical surfaces which are of a variable radius $R_b$, the particular value of the radius $R_b$ being determined by the axial position of the points of contact between the surfaces 98 and 100 and with the surfaces 42 and 44. In addition, continuous contact of the traction surfaces 42 and 44 along the length of the conical surfaces 98 and 100 is accommodated by simple axial movement of the rings 38 and 40 because the apical half-angle of the conical surfaces 98 and 100 is made equal to the angle at which the axes 24 and 26 intersect.

To develop a normal force by which torque may be transmitted by friction between the surfaces 42, 44 and 98, 100, a ball/ramp assembly 102 is splined to be rotatably coupled with the shaft 98 and located between the base ends of the cone members 94 and 96. Complementing ramps in this assembly cooperate with balls 104 in a manner such that torque differential between the cones 94 and 96 and the shaft 98 will cause the cones 94 and 96 to be urged in opposite directions and into engagement with the rings 38 and 40. Thus while the cones 94 and 96 are rotatable on the shaft 98, the transmission of torque from the shaft 98 through the balls 104 to the cones causes the cones to rotate with the shaft 98 under a differential torque loading. The ball/ramp assembly 102 is disclosed more completely in a commonly-assigned copending application Ser. No. 5,605, filed Jan. 22, 1979 by Harvey N. Pouliot.

In accordance with the invention, the beta body 92 includes a pair of pinion gears 106 and 108 keyed or otherwise nonrotatably fixed at opposite ends of the shaft 98. The pinion gears 106 and 108 mesh, respectively, with the ring gears 32 and 34 to provide a gear set at each of the opposite ends of the beta body 92. The relative sizes of the pinion gears and the ring gears establish a gear ratio factor k which may be determined numerically by dividing the diameter of the pinion gears 106 and 108 by the diameters of the ring gears 32 and 34. Because the ring gears will always be larger than the pinion gears, the gear ratio factor k will always be less than 1 and, moreover, because the pinion gears and ring gears rotate in the same direction, the factor k will be of a positive algebraic sign.

As will be more apparent from the ensuing description of the operation of the embodiment illustrated in FIG. 1, the unit output shaft 36 may be connected directly to a load such as the final propelling shaft of an automotive vehicle. Alternatively, the unit output shaft 36 may be coupled to a system output shaft 110 through conventional gearing 111 contained in the casing end section 18. The gearing 111 may be any of several well known types of gearing arrangements capable of providing multiple increments of gear ratios including a reversing gear by which the shaft 110 may be rotated in a direction opposite from that of the unit output shaft 36. One such type of conventional gearing is illustrated in FIG. 1 to include a drive gear 112 keyed to the unit output shaft 36 and meshing with a driven gear 114 keyed on a counter shaft 116. A gear 118, rotatable on the counter shaft, may be coupled for rotation therewith by a sprag clutch 120 to drive a gear 122 engageable by a sprag clutch 124 with the system output shaft 110. Relative sizes of the gears 112 and 114 will effect a step-down speed reduction of the shaft 110. A direct drive between the shafts 36 and 110 may be established by adjusting the clutch 124 to couple the gear 112 with the shaft 110 while the clutch 120 is in a released or neutral condition. Finally, a reversal of direction in the shafts 36 may be established by adjusting the clutch 120 to couple the counter shaft 116 with a gear 126 in mesh through a reversing idler 128 with a gear 130 keyed to the shaft 110. As mentioned, the gearing thus described is optional, and may vary considerably from that shown, the described gearing being merely exemplary of a type of gearing by which the shaft 110 may be coupled with the unit output shaft 36 in gear ratios representing "low," "drive" and "reverse."

In light of the structural characteristics of the embodiment thus described with reference to FIG. 1, it will be seen that the speed relationships of various driving and driven components will be determined by several design parameters which may be varied as desired depending on the overall power train in which the transmission is used. To facilitate the ensuing description of relative speeds, the following letter designations will be used:

$\overset{\circ}{\psi}$ is the input speed or the rotational speed of the shaft 28;

$\overset{\circ}{\alpha}$ represents the rotational speed of the alpha body 84 about the first axis 24;

$\overset{\circ}{\beta}$ designates the rotational speed of the beta body 92 about the second axis 26 in a fixed frame of reference;

$\overset{\circ}{\omega}$ is the rotational speed of the omega body 30 about the first axis 24;

$\overset{\circ}{\theta}$ is the unit output speed or the rotational speed of the shaft 36;

$\rho$ is the radius ratio of the traction surfaces 42, 44 and 98, 100 or the ratio $R_w/R_b$ to be a value greater than 1;

$k_1$ is the diameter ratio of the gear 106 to the ring gear 32; and $k_2$ is the diameter ratio of the gear 108 to the ring gear 34.

Because of the particular configuration of the traction surfaces 42, 44 and 98, 100, the radius ratio factor $\rho$ will vary from a minimum value ($\rho \downarrow$) when the rings 38 and 40 are positioned adjacent to each other or close to the point S of axes intersection. Also the numerical value of the radius ratio $\rho$ will increase to a maximum value ($\rho \uparrow$) when the surfaces 42 and 44 contact the small end of the surfaces 98 and 100 and when the rings 38 and 40 are spaced a maximum distance from each other. Although the upper limit of the radius ratio ($\rho \uparrow$) is dependent largely on size of the overall transmission unit 10, the minimum value of the radius ratio ($\rho \downarrow$) may approach but not reach a value of 1. For purposes of gaining a full appreciation of the invention, values of the radius ratio $\rho$ may be assumed to extend from a minimum value of 1.15 to a maximum value of 2.31.

Although the gear ratio factors $k_1$ and $k_2$ may differ from one another, these values are intentionally equal to one another and are generally designated by the common reference letter k. The numerical value of the factor k may vary considerably depending on the configuration of gearing used to link the beta body 92 to the input and output shafts 28 and 36. Also the algebraic sign of the k factor value may change. In the illustrated embodiment, it is preferred that the numerical value of the factor k be selected as the reciprocal of the maximum value of $\rho$ or $\rho \uparrow$. Thus, where $\rho \uparrow$ is equal to 2.31, the factor k is equal to 0.433. This value of the factor k is entirely practical in the embodiment illustrated in FIG. 1 and also the algebraic sign of the factor k will be positive because the ring gears 32 and 34 rotate in the same direction as the gears 106 and 108 in meshing engagement therewith.

Figure 5:
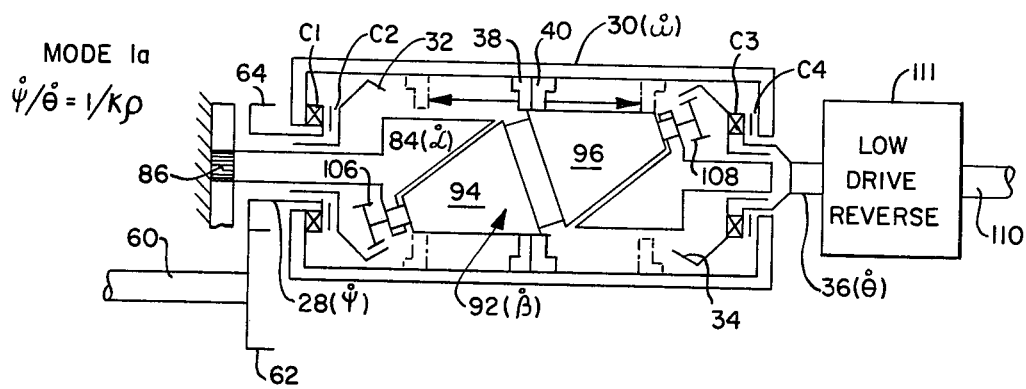
FIGS. 5 and 6 are schematic illustrations depicting two modes of operation for the embodiment illustrated in FIG. 1.
Figure 6:
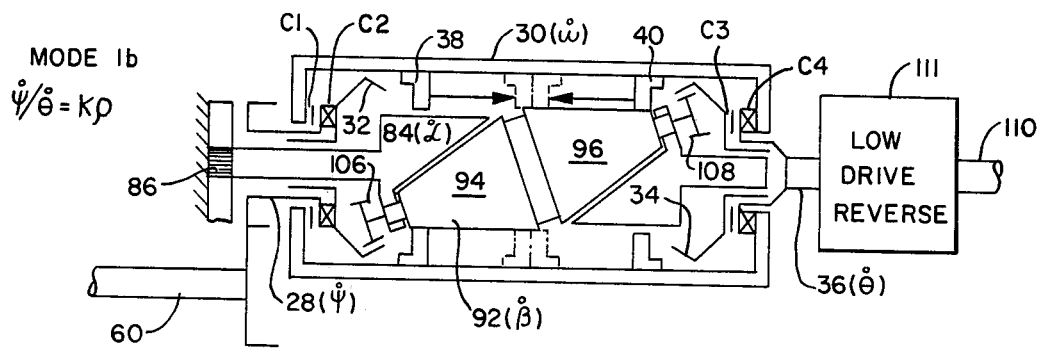
Figure 7:
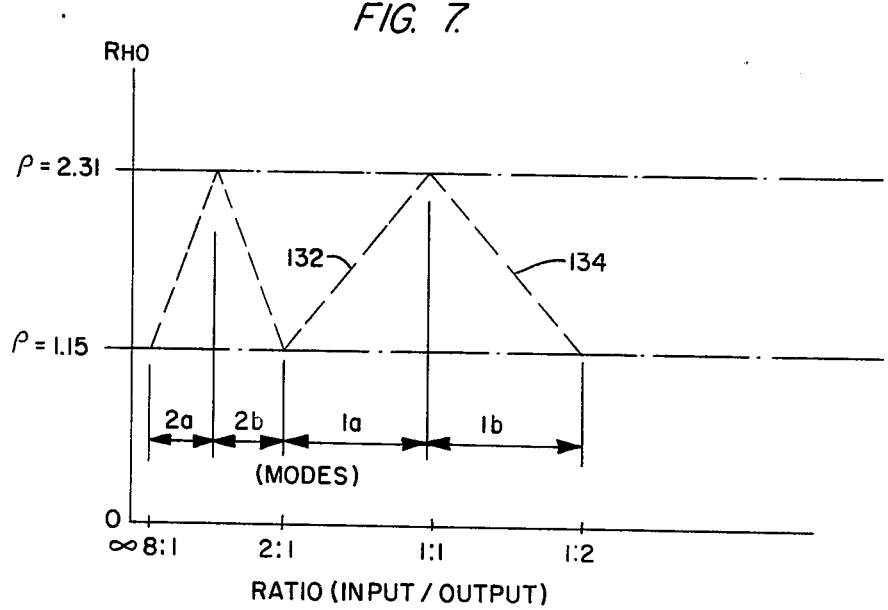
FIG. 7 is a graph in which values of the radius ratio are plotted against speed ratios for the embodiment of FIG. 1.

Operation of the embodiment illustrated in FIG. 1 will now be described with reference to FIGS. 5-7 of the drawings. In FIGS. 5 and 6, the components of the transmission 10 are illustrated schematically and the previously identified speed designations are included adjacent the reference numerals designating the components rotatable at such speeds, respectively. Also in FIGS. 5 and 6, conditions of the clutches C1, C2, C3 and C4 are represented by an "X" when engaged and by a vertical line when disengaged.

Thus in FIG. 5, a mode 1a is effected by engaging the clutches C1 and C3 while the clutches C2 and C4 are disengaged so that omega body 30 will be driven at the same speed as the input shaft 28 ($\overset{\circ}{\omega}=\overset{\circ}{\psi}$). The rings 38 and 40, initially positioned at the large end of the cone members 94 and 96 ($\rho=1.15$), are then advanced outwardly in the direction of the arrows toward the maximum value of $\rho$ or ($\rho=2.31$). The alpha body 84 is retained against rotation by the splines 86.

By an analysis of equations (1) and (2) given above, it will be seen that the speed ratio in mode 1a, when expressed as input/output will vary as the reciprocal of the function $k\rho$ or:

$$\overset{\circ}{\psi}/\overset{\circ}{\theta}=1/k\rho. \qquad (3)$$

Moreover, given the assigned values of k and $\rho$ it will be seen that the reciprocal of the function $k\rho$ will vary from 2 to 1 as the value $\rho$ is increased to its maximum value. Further, in mode 1a the range of input/output speed ratios extends from 2 to 1 to unity or 1:1.

When the rings 38 and 40 are extended to their outer most limits, ($\rho \uparrow$), the condition of the clutches C1, C2, C3 and C4 is alternated to the condition illustrated in FIG. 6 to effect an operational mode 1b. Specifically, the clutches C2 and C4 are now engaged whereas the clutches C1 and C3 are disengaged. Thus in mode 1b, the gear 32 is connected directly with the drive shaft 28 and will rotate the beta body 92 at approximately 2.31 times the speed of the input shaft 28. Since the rings 38 and 40 are positioned so that $\rho$ equals 2.31, the speed ratio $\overset{\circ}{\psi}/\overset{\circ}{\theta}$ will remain at 1 at the initiation of mode 1b. As the rings 38 and 40 are moved back toward their central position, the input/output speed ratio or $\overset{\circ}{\psi}/\overset{\circ}{\theta}$ will vary in accordance with the function $k\rho$ or:

$$\overset{\circ}{\psi}/\overset{\circ}{\theta}=k\rho. \qquad (4)$$

Thus when the rings 38 and 40 reach their central position, the input/output ratio of the shafts 28 and 36 is 1:2.

In light of the described operations in modes 1a and 1b, it will be appreciated that a continuously variable speed ratio range of 4:1 is achieved by these two modes of operation and that shifting between the two modes is fully synchronous. In FIG. 7 of the drawings, dashed lines 132 and 134 represent the result of plotting varying values of the radius ratio $\rho$ against speed ratio expressed as the speed $\overset{\circ}{\psi}$ of the unit input shaft 28 divided by the speed $\overset{\circ}{\theta}$ of the unit output shaft 36. It will be noted that the 4:1 range of speed ratios, as depicted by the curves in FIG. 7, extend from a 2:1 underdrive to a 1:2 overdrive. It is contemplated that the limits of the 4:1 range may be shifted from a 4:1 underdrive to a 1:1 or direct drive either by changing the ratio of the input gears 62 and 64 or by modifying the gearing 111 at the output of a system incorporating the transmission unit 10.

Given the arrangement of the gearing unit 111, it will be appreciated that the range of speed ratios may be extended to 16:1 or from an underdrive of 8:1 to an overdrive of 1:2 by operating the transmission unit additionally in two further modes 2a and 2b. In other words, the operation described above with respect to FIGS. 5 and 6 would be carried out with the gearing 111 first in a "low" speed ratio and operating the unit through modes 2a and 2b. The gearing 111 would then be shifted into direct drive and the sequence of operational modes in the unit 10 repeated. Synchronous operation throughout the four modes of operation thus proposed is possible because of the return of the rings 38 and 40 to their initial position at the conclusion of each mode type operation.

In FIG. 2 of the drawings, an alternative embodiment of the invention is shown in which parts which are identical to the embodiment of FIG. 1 are identified by the same reference numeral, in which parts functionally like but structurally modified from the embodiment of FIG. 1 are designated by the same reference numerals primed and in which additional components are designated by new reference numerals.

The principal difference between the embodiment of FIG. 2 and that of FIG. 1 is that in the latter embodiment, the shaft extension 80' of the alpha body 84 is journalled for rotation on the first axis 24 and carries a clutch plate 136 by which the alpha body 84 may be either retained against rotation on the axis 24 by a clutch C5 operable to couple the plate 136 and the frame 12' or coupled by a clutch C6 directly with the unit input shaft 28'. In addition, a band clutch C7 is provided to retain the omega body 30' against rotation relative to the frame 12' or to release the omega body 30' for rotation as in the previous embodiment. In all other respects, the transmission 10' is the same as the transmission unit 10 illustrated in FIG. 1.

As shown schematically in FIGS. 8-11 of the drawings, three distinct modes of operation are contemplated for the embodiment of FIG. 2 to provide an essentially synchronous range of input/output speed ratios extending from infinity to an overdrive of 1:2. It is equally contemplated that any two of the three modes of operation may be deployed without departure from the present invention.

Figure 8:
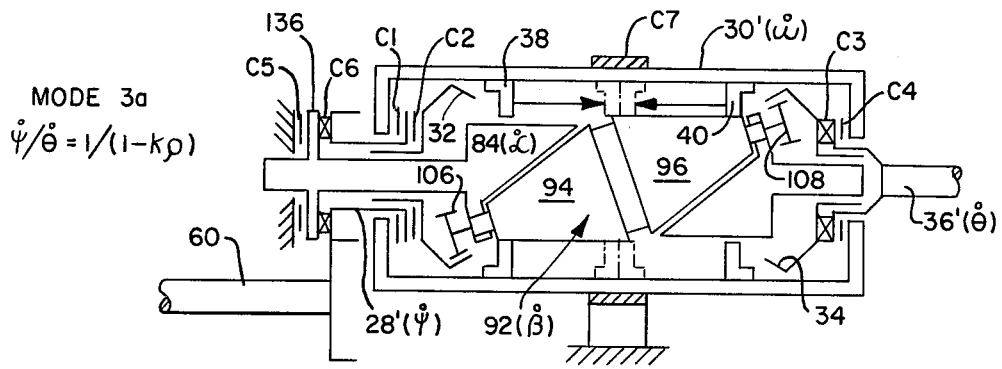
FIGS. 8–10 are schematic views depicting three operational modes for the embodiment illustrated in FIG. 2.

In FIG. 8, a mode 3a is depicted in which the clutches C3, C6 and C7 are engaged whereas the other clutches C1, C2, C4 and C5 are disengaged. As a result of this mode of operation, the unit input shaft 28' is coupled directly with the alpha body 84 to drive same in rotation about the first axis 24. The beta body 92 will be carried in nutation so that second axis 26 is moved in a biconical path about the first axis 24. Because of the engaged condition of the clutch C7, the omega body 30' and the rings 38 and 40 will be held with the frame against rotation. Frictional engagement of the traction surfaces on the cone members 94 and 96 with the rings 38 and 40, however, will develop rotation of the beta body 92 about the second axis 26 in addition to the nutational movement of the beta body with the alpha body 84. The resulting movement of the beta body 92 will be transmitted through the pinion gear 108 and the ring gear 34 to the output shaft 36' as a result of the engaged condition of the clutch C3.

The input/output speed ratio of the transmission in the operational mode 1c will be in accordance with the equation:

$$\overset{\circ}{\psi}/\overset{\circ}{\theta}=1/(1-k\rho). \qquad (5)$$

Because the rings 38 and 40 are initially positioned in their outer-most position in mode 3a ($\rho=2.31$) the function ($1-k\rho$) will be equal to zero because the factors k and $\rho$ are reciprocals. With decreasing values of $\rho$ to a value of 1.15 and a value of the function $k\rho$ to 0.5 ($k=0.433$) the speed ratio will increase to 2:1.

Figure 9:
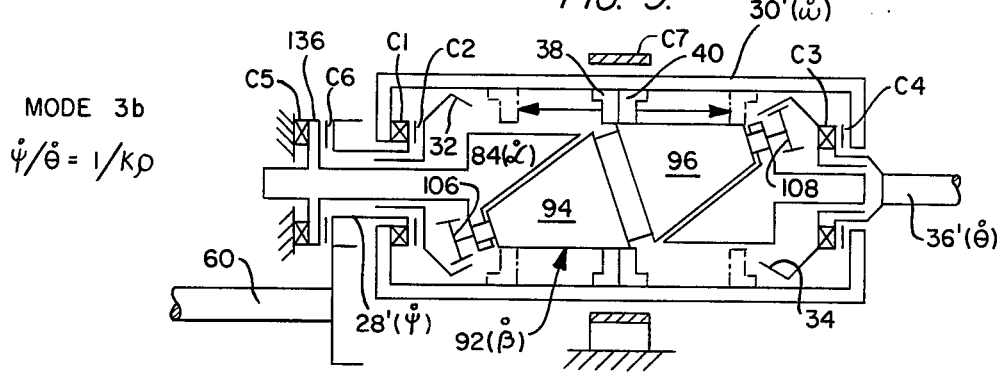
Figure 10:
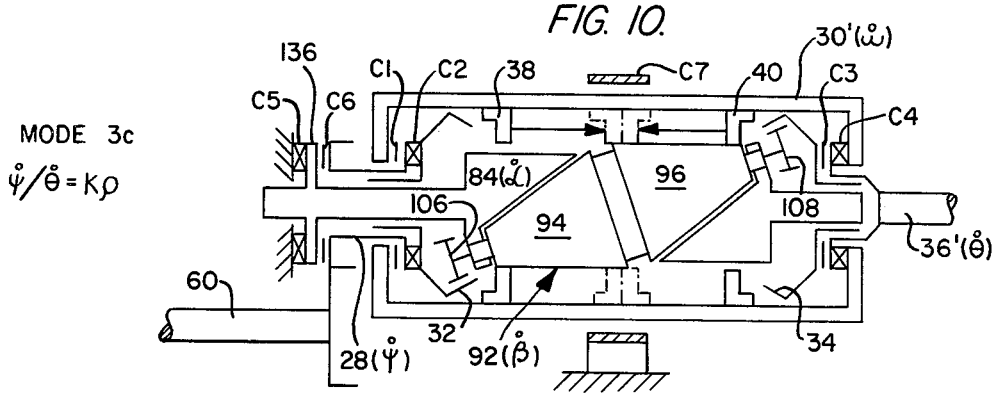
Figure 11:
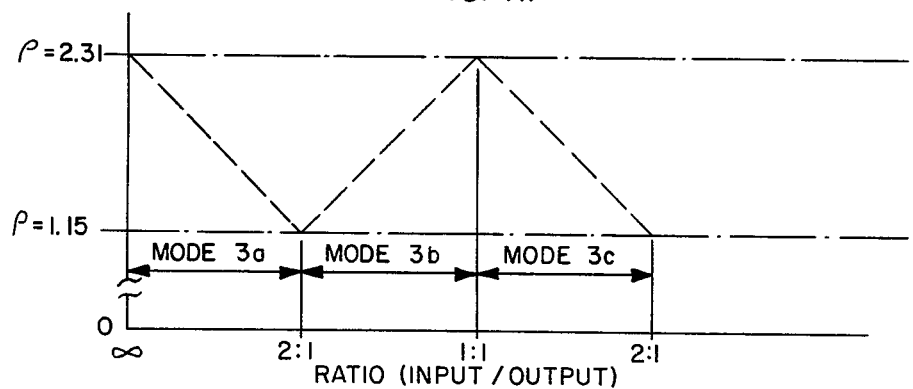
FIG. 11 is a graph similar to FIG. 7 but depicting relative values in the three modes of operation of the embodiment illustrated in FIG. 2.

In modes 3b and 3c depicted, respectively, in FIGS. 9 and 10 of the drawings, the clutch C5 is engaged to retain the alpha body 84 against rotation and the clutch C7 is disengaged to release the omega body 30' for rotation about the first axis. The clutches C1, C2, C3 and C4 are adjusted so that modes 3b and 3c parallel modes 1a and 1b described above with respect to FIGS. 5 and 6. This condition is represented in FIG. 11 where three straight line curves representing modes 3a, 3b and 3c are shown in which varying values of the radius ratio ρ are plotted against speed ratio in terms of input/output.

In FIGS. 3 and 4 of the drawings, the relative direction of the rotational velocity at the gears 106, 32 and 108, 34 are depicted by arrows designated by the respective letters connoting velocity in the several equations given. Thus in FIG. 3, where the transmission is operated in mode 3a, the gears 106 and 108 will be carried in orbital movement at the speed $\overset{\circ}{\alpha}$ by the alpha body 84. The engagement of the traction surfaces on the cone members 94 and 96 with the rings 38 and 40, together with the omega body 30' being retained against rotation, will cause the velocity $\overset{\circ}{\beta}$ to be in an opposite direction but less than the value of $\overset{\circ}{\alpha}$ so as to be a subtractive velocity component. The result is that the ring gear 34 (as well as the ring 32 which idles in mode 3a) will be carried in the direction of rotation of the alpha body 84 but at a reduced speed due to rotation of the gears 106 and 108 in the opposite direction. Where the alpha body is held against rotation as in mode 3b and mode 3c, the gears 106 and 108 will rotate at the velocity $\overset{\circ}{\beta}$ in the same direction of rotation as the input shaft 28 or 28'. The rotational direction of the output shaft or of the omega body 30 in these latter modes of operation will be in the same direction as the rotation of the beta body 92 at the velocity $\overset{\circ}{\beta}$.

In light of the foregoing description of structural variations and operational modes capable of being carried into practice by the disclosed embodiments, the several unique features of the present invention may be appreciated. For example, the basic organization of the previously disclosed alpha, beta and omega bodies is advantageously deployed to provide a symmetrical and parallel transmission of torque by friction between the respective beta and omega bodies 92 and 30 with no component of axial loading at the bearings supporting these bodies. In other words, the facility demonstrated by the basic three-body transmission unit to transmit large amounts of power at infinitely variable speeds and at high efficiencies is retained intact. The unit gearing, represented by the gears 32, 34, 106 and 108, is simple reduction gearing with no regenerative operation or feedback of a type characteristic of epicyclic gearing in at least modes 1, 2, 3b and 3c. In this respect it is noted that in mode 3a, the combined motion of the beta body and the gears 106, 108 is epicyclic and can impose a feedback power load on the traction surfaces 42, 44, 98 and 100 during operation at or near zero output or where the input/output speed ratio approaches infinity. Also, the physical arrangement of the gears 32, 34, 106 and 108 permits a gear reduction factor (k) which complements the radius ratio (ρ) to enable an operational mode shift without having to return the rings 38 and 40 to a position other than the one they were in at the end of the previous mode.

Other features and advantages of the invention as disclosed herein will become apparent to those skilled in the art from the foregoing description. It is expressly intended, therefore, that the foregoing description is illustrative of preferred embodiments only, not limiting, and that the true spirit and scope of the present invention is to be determined by reference to the appended claims.

I claim:

1. In an infinitely variable transmission having a power input, a power output, and means to transmit power from said input to said output including an alpha body concentric with a first axis and rotatably supporting a beta body having a pair of traction surfaces of revolution about a second axis intersecting the first axis at a point of axes intersection, the traction surfaces on the beta body being in engagement on opposite sides of the point of axes intersection with a pair of traction surfaces of revolution about the first axis and carried on an omega body concentric with the first axis, the radius ratio of traction surfaces on the respective beta and omega bodies varying between minimum and maximum values by axial shifting of the points of traction surface engagement relative to the point of axes intersection, the improvement comprising:

means for connecting said power input with and to impose a driving torque on one of said alpha, beta and omega bodies;

means for retaining another of said bodies against rotation to impose a reaction torque thereon, said driving torque being transmitted through said traction surfaces to impose a driven torque on the remaining one of said three bodies;

means for connecting the remaining one of said bodies to drive said power output; and means to alternate the imposition of at least two of said driving, reaction and driven torques on at least two of said bodies to provide different ranges of input/output speed ratios, the speed ratios in each such range being variable between range end limits determined by adjustable values of the radius ratio of the traction surfaces.

2. The apparatus recited in claim 1, comprising first and second gear sets, each of said gear sets being operative to convert torque on one of the first and second axes to torque on the other of such axes, and having a gear ratio factor equal to the reciprocal of the maximum value of said traction surface radius ratio when the minimum value of said radius ratio is in excess of one.

3. The apparatus recited in claim 2, wherein said radius ratio (ρ), said gear ratio factor (k), the speed of said power input $\overset{\circ}{\psi}$ and the speed of the power output $\overset{\circ}{\theta}$ are related in one of said different ranges of speed ratios by the equation:

$$\overset{\circ}{\psi}/\overset{\circ}{\theta} = 1/(1-k\rho)$$

and in another of said different ranges by the equation:

$$\overset{\circ}{\psi}/\overset{\circ}{\theta} = 1/k\rho$$

thereby to provide two speed ranges having a common end limit.

4. The apparatus recited in claim 2, wherein said radius ratio (ρ), said gear ratio factor (k), the speed of said power input $\overset{\circ}{\psi}$ and the speed of said power output $\overset{\circ}{\theta}$ are related in one of said different ranges of speed ratios by the equation:

$$\overset{\circ}{\psi}/\overset{\circ}{\theta} = 1/k\rho$$

and in another of said different ranges by the equation:

$$\overset{\circ}{\psi}/\overset{\circ}{\theta} = k\rho$$

thereby to provide two speed ranges having a common end limit.

5. The apparatus recited in either of claims 1 or 2, including means to alternate the imposition of said driving torque between said alpha body and said beta body, the imposition of said reaction torque between said alpha body and said omega body and the imposition of said driven torque between said beta body and said omega body thereby to provide three different ranges of input/output speed ratios.

6. The apparatus recited in claim 5, wherein the input/output speed ratio in one of said three ranges varies according to the reciprocal of 1 minus a function of the radius ratio, in a second range according the reciprocal of a function of the radius ratio and in a third range directly as a function of the radius ratio.

7. The apparatus recited in claim 2, wherein each of said gear sets comprises a pinion gear rotatable with said beta body and a ring gear in mesh with said pinion gear, said ring gear being rotatable on said first axis.

8. The apparatus recited in either of claims 2 or 7, wherein said gear sets are positioned at opposite ends of said beta body.

9. The apparatus recited in either of claims 2 or 7, wherein said means to alternate the imposition of said torques on said bodies, respectively, comprises clutch means for coupling one of said gear sets alternately to said omega body or said power input and for coupling the other of said gear sets alternately to said power output or said omega body.

10. The apparatus recited in claim 9, wherein said means for retaining one of said bodies against rotation comprises a fixed means for retaining said alpha body against rotation.

11. The apparatus recited in claim 9, including a fixed frame and wherein said means for retaining one of said bodies against rotation comprises releasable means for coupling said alpha body and said frame.

12. The apparatus recited in claim 11, comprising further clutch for alternately coupling said alpha body or said omega body to said frame and for alternately coupling said power input to said beta body and said alpha body, respectively.

13. In an infinitely variable transmission having a power input, a power output, and working bodies including an omega body supported for rotation on a first axis and having a pair of rings to define internal traction surfaces of revolution about said first axis, a beta body supported for rotation on a second axis inclined with respect to and intersecting said first axis at a point of axes intersection, said beta body including a pair of cone-like members to define oppositely convergent conical traction surfaces of revolution about said second axis, means for forceably separating said cone-like members to urge said traction surfaces on said respective beta and omega bodies into torque transmitting contact at two diametrically opposite points of contact, the radius ratio of said engaged traction surfaces at said points of contact varying between minimum and maximum values by axial shifting of said rings substantially at symmetry with respect to said point of axes intersection, the improvement comprising:

means for connecting said power input with and to impose a driving torque on one of said beta and omega bodies, said driving torque being transmitted through said traction surfaces to impose a driven torque on the other of said beta and omega bodies;

means for connecting the other one of said bodies to drive said power output; and means to alternate the imposition of said driving and driven torques on said beta and omega bodies to provide two different ranges of input/output speed ratios, the speed ratios in each such range being variable between range end limits determined by adjustable values of the radius ratio of the traction surfaces.

14. The apparatus recited in claim 13, wherein the working bodies further include an alpha body rotatable on said first axis, said alpha body having journal means to support said beta body, the improvement further comprising:

means for releasably retaining one of said alpha and omega bodies against rotation to impose a reaction torque thereon, means to alternate the imposition of said driving torque between said alpha body, said omega body and said beta body; and means to alternate the imposition of said driven torque between said beta body and said omega body, thereby to provide three different ranges of input/output speed ratios.

15. The apparatus recited in either of claims 13 or 14, wherein each of said speed ratio ranges is a continuous extension of another of said ranges.

16. The apparatus recited in either of claims 13 or 14, wherein movement of said rings to decrease to increase, respectively, the speed ratio in any consecutive two of said ranges is in alternately opposite directions, thereby to synchronize movement of said rings with shifting between said ranges.

17. In an infinitely variable transmission having a power input, a power output, a frame, an omega body journalled in said frame for rotation on a first axis and having a pair of ring carried internal traction surfaces of revolution about said first axis, a beta body having exterior conical traction surfaces of revolution about a second axis inclined with respect to and intersecting said first axis at a point of axes intersection, an alpha body carried by said frame for response to torque on said first axis, said alpha body supporting said beta body for rotation on said second axis, means for urging said traction surfaces on said respective beta and omega bodies into torque transmitting contact at two diametrically opposite points of contact, the radius ratio of said engaged traction surfaces at said points of contact varying between minimum and maximum values by axial shifting of said ring carried internal traction surfaces, the improvement comprising:

means to retain said alpha body against rotation in said frame;

first releasable coupling means for drivably connecting said power input and said omega body;

second releasable coupling means for drivably connecting said beta body and said power input;

third releasable coupling means for drivably connecting said beta body and said power output; and fourth releasable coupling means for drivably connecting said omega body and said power output;

each of said coupling means being adjustable between engaged and released conditions, said first and third releasable coupling means being engaged alternately with said second and fourth releasable coupling means whereby power transmission in one mode of operation is from said omega body through said beta body to said power output and in another mode of operation is from said beta body through said omega body to said power output thereby to provide in each mode of operation, a separate range of speed ratios by adjustment of said radius ratio between minimum and maximum values.

18. The apparatus recited in claim 17, wherein said means to retain said alpha body against rotation in said frame comprises means to permanently couple said alpha body and said frame.

19. The apparatus recited in claim 17, wherein said means to retain said alpha body against rotation in said frame comprises fifth releasable coupling means.

20. The apparatus recited in claim 19, including sixth releasable coupling means for drivably connecting said power input and said alpha body and seventh releasable coupling means for retaining said omega body against rotation on said first axis.

21. The apparatus recited in claim 17, wherein said second releasable coupling means comprises a pinion gear on one end of said beta body, a ring gear in mesh with said pinion gear and rotatable on said first axis, and clutch means for connecting said ring gear and said power input.

22. The apparatus recited in claim 21, wherein said third releasable coupling means comprises a second pinion gear rotatable with said beta body on the opposite end thereof from said first mentioned pinion gear, a second ring gear rotatable on said first axis and clutch means for coupling said second ring gear and said power output.

23. The apparatus recited in claim 22, wherein the respective diameters of said pinion gears and said ring gears are equal.

24. The apparatus recited in claim 23, wherein the diametric ratio of each of said pinion gears to each of said ring gears is the reciprocal of the maximum value of said traction surface radius ratio when said radius ratio is always in excess of one.

25. The method of operating an infinitely variable transmission having an alpha body concentric with a first axis and rotatably supporting a beta body concentric with and having rotation surfaces of revolution about a second axis intersecting the first axis at a point of axes intersection, the traction surfaces on the beta body being in engagement at diametrically opposite points of contact with traction surfaces of revolution about the first axis on an omega body concentric with the first axis, the radius ratio of the engaged traction surfaces on the respective beta and omega bodies varying between minimum and maximum values by axial shifting of the points of traction surface contact and each of said bodies being adapted for rotation about the axis with which they are respectively concentric, said method comprising the steps of:

transmitting input power to one of said alpha, beta and omega bodies to provide a driving torque;

holding another of said bodies against rotation on the axis thereof to impose a reaction torque on said one body;

transmitting said driving torque through said traction surfaces to impose a driven torque on the remaining one of said bodies to be driven by said input power at speeds variable in accordance with variation of said radius ratio between minimum and maximum values;

transmitting power from said remaining one of said bodies an output power in a first range of continuously variable speed ratios;

shifting the transmission of input and output power between at least two of said three bodies to reverse the imposition of at least two of the driving, driven and reaction torques on said two of said three bodies; and transmitting power from that one of said three bodies to which the driven torque is shifted, as output power in a second range of continuously variable speed ratios.

26. The method recited in claim 25, wherein the input/output speed ratios in said first range is related to the ratio ($\rho$) of the traction surface radius on the omega body to the traction surface radius on the beta body and to a gear ratio factor (k) of gear sets for alternately connecting said beta body to said power input and said power output as being equal to the function ($1/k\rho$) and where the input/output speed ratio is said second speed ratio range is equal to the reciprocal of said function.

27. The method recited in claim 26, comprising the steps of varying the radius ratio ($\rho$) from a minimum numerical value thereof to a value equal to the reciprocal of the factor (k) in said first range, shifting to said second range and returning the radius ratio ($\rho$) to the minimum value thereof in said second range.

28. The method recited in claim 25, comprising the steps of varying the radius ratio of the respective traction surfaces from minimum to maximum in said first range and from maximum to minimum in said second range.

* * * * *